United States Patent [19]

LaMarca

[11] Patent Number: 5,538,220
[45] Date of Patent: Jul. 23, 1996

[54] MOLDED SOLENOID VALVE AND METHOD OF MAKING IT

[75] Inventor: Drew LaMarca, Whippany, N.J.

[73] Assignee: Automatic Switch Company, Florham Park, N.J.

[21] Appl. No.: 326,872

[22] Filed: Oct. 21, 1994

[51] Int. Cl.[6] .............................. F16K 31/06; H01F 3/00
[52] U.S. Cl. ................................. 251/129.15; 335/278
[58] Field of Search ..................... 251/129.01, 129.15, 251/366; 335/278, 281, 260

[56] References Cited

U.S. PATENT DOCUMENTS

| | | | |
|---|---|---|---|
| 3,262,027 | 7/1966 | Zaleske et al. | 251/129.15 |
| 4,679,767 | 7/1987 | Vollmer et al. | 251/129.15 |
| 4,728,916 | 3/1988 | Fontecchio et al. | 335/278 X |

*Primary Examiner*—Kevin Lee
*Attorney, Agent, or Firm*—Levine & Mandelbaum

[57] ABSTRACT

A solenoid valve has a yoke with reinforcing integral frame members surrounding inlet and outlet connectors molded into a plastic body which encapsulates the solenoid coil and electrical components and forms the valve housing.

8 Claims, 2 Drawing Sheets

5,538,220

MOLDED SOLENOID VALVE AND METHOD OF MAKING IT

BACKGROUND OF THE INVENTION

This invention relates to a thermoplastic and thermoset molded solenoid valve. More specifically, the invention is directed to an improved and inexpensive solenoid valve which can be electrically actuated to control liquid flow between two conduits.

It is known in the art to construct solenoid valves for controlling liquid flow between two conduits. Such valves typically include a separate coil assembly, coil encapsulation, a yoke, a main housing, mounting hardware for mounting the yoke within the housing, and an inlet port and an outlet port in communication with an opening in a valve seat which is selectively sealed and unsealed by movement of a valve member mounted on an armature within a core tube surrounded by the coil. Depending on the size of the conduits with which the valve is to be used, differently sized ports and housings must be stocked so that the right combination can be assembled for a given application.

With prior art valves, valve components are ordered and stocked based on marketing forecasts and component lead time requirements. It is not until after the electrical and pressure ratings demanded by a specific application are known that the separate valve components can be selected for assembly to achieve a solenoid valve with a fixed CV rating.

The components of the ports and housing are expensive. Due to the inability to accurately forecast application needs, it is necessary to stock excess components, some of which may never be used. Another source of waste in addition to the costs of stocking stock unused parts is due to dimensional variations among the components due to excessive tolerances and manufacturing deficiencies. Components intended to be assembled together sometimes are incapable of proper fit, particularly where fluid tight connections must be formed.

SUMMARY OF THE INVENTION

The aforementioned problems of the prior art are overcome by the instant invention which provides for a solenoid valve having a yoke with first and second spaced members, a coil mounted within the yoke between the first and second members, the coil including a core tube with two opposite ends and a winding circumscribing the core tube, a stationary pole piece mounted at one end of the core tube, an inlet port, an outlet port, a valve seat mounted between, and having an opening in communication with, the inlet port and the outlet port, a movable armature slidably mounted in the core tube, and a valve member mounted on the movable armature for selectively sealing and unsealing the valve seat opening. A frame depending from, and integral with, the yoke, circumscribes the inlet port and the outlet port. A housing formed from a setting plastic or epoxy material encapsulates the yoke, and reinforces the housing adjacent the inlet port and the outlet port. The frame has first and second rings which are D-shaped with a common planar portion coextensive with one of the yoke members and axially spaced respective depending arcuate straps. The ports taper inwardly toward the valve seat opening resulting in a wedging action to provide a seal which tightens against a pipe inserted thereinto. The plastic material forms a coil encapsulation integral with the housing.

The invention further teaches a method of making a solenoid valve including the steps of mounting in a yoke assembly having a yoke, a coil having a core tube with two opposite ends and a winding circumscribing the core tube, a stationary pole piece mounted at one end of the core tube, and a movable armature slidably mounted in the core tube, placing the yoke assembly in a mold, having the pattern of the solenoid housing, including the inlet port and outlet port, mounting in the mold removable core pins having respective outer circumferences corresponding to the inner circumferences of the inlet and outlet ports for defining the size and shape of the ports, filling the remaining space in the mold with a setting plastic or epoxy material in a flowable state, whereas causing the plastic material to set for encapsulating the coil and forming the housing with integral inlet and outlet ports, and separating the housing from the mold and core pins.

It is therefore an object of the invention to provide a solenoid valve which employs a molded body in lieu of a separate housing, inlet and outlet ports, coil encapsulation, and potting material for electrical components.

Another object of the invention is to provide a solenoid valve having a molded body which concurrently serves as a coil encapsulation and potting material for electrical components.

Still another object of the invention is to provide a solenoid valve having a molded body in which inlet and outlet ports are integrally formed.

A further object of the invention is to provide a solenoid valve having a molded body with inlet and outlet ports reinforced by the solenoid yoke.

Still a further object of the invention is to provide a solenoid valve having a molded body with inlet and outlet ports which can be fabricated with one of many predetermined sizes during the molding process.

Other and further objects of the invention will be apparent from the following drawings and description of a preferred embodiment of the invention in which like reference numerals are used to indicate like parts in the various views.

DESCRIPTION OF THE PREFERRED EMBODIMENT

Figure 1:
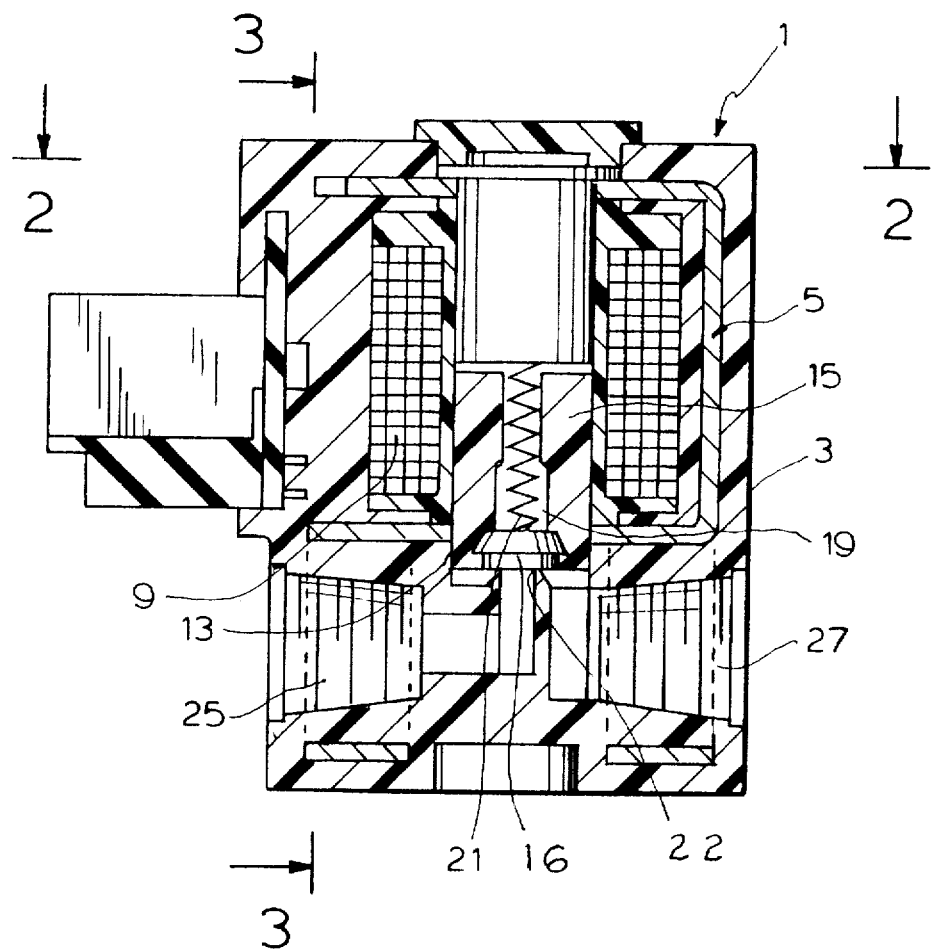
FIG. 1 is a side sectional elevation view of a molded valve in accordance with the preferred embodiment of the invention.

Referring now to FIG. 1 of the drawings, there is shown a two-way solenoid valve 1 including a yoke 5 of magnetic material, an electrical coil 7, and a housing 3. The coil 7 has a bobbin 11 and a winding 9. The bobbin 11 has a core tube 13 which serves as an armature-guide. Within the cylindrical bore 12 in the core tube 13 is an axially reciprocable armature 15. Mounted on the lower end of the armature 15 is a resilient valve member 16.

A pole piece in the form of a plug nut 17 of magnetic material is fixedly mounted in the upper region of the armature guide 13 and extends into the bore 12. The armature 15 has a blind cylindrical bore 19 in which there is disposed a coil spring 21 having a free end in engagement with plug nut 17. The spring 21 normally urges armature 15 toward a valve seat 22, that is to the normally closed position of the valve 1, whereat the valve member 16 seals an opening in the valve seat.

Figure 2:
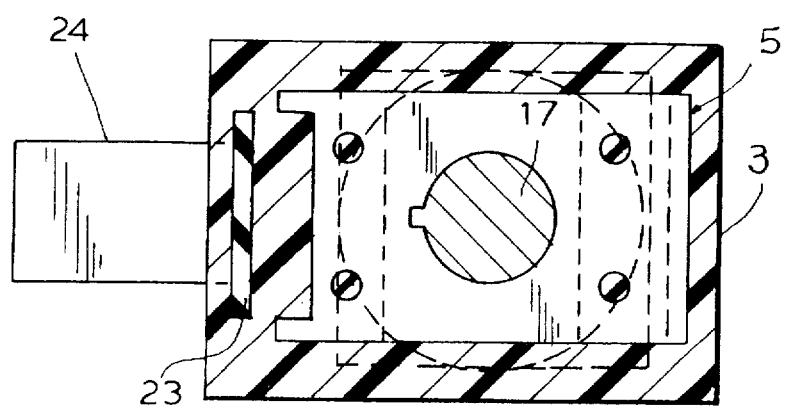
FIG. 2 is a top sectional view of a molded valve in accordance with the preferred embodiment of the invention taken through line 2—2 of FIG. 1.

Referring additionally to FIG. 2, an electronics module has a printed circuit board 23 on which there is mounted a full wave bridge rectifier for enabling the valve 1 to be operated from an a.c. power source or d.c. power source. Also mounted on the printed circuit board 23 is an electrical connector 24 which in the preferred embodiment of the invention is an industry standard type commonly used in telephone applications. The connector can receive a cable carrying power and control signals for operating the solenoid valve 1. Telephone connector, special connectors, wire leads or spade terminals can be mounted on the printed circuit board based on selected requirements.

The yoke 5, coil 7, and printed circuit board 23 are overmolded with a plastic or epoxy material which forms the housing 3. In the preferred embodiment of the invention, and example of the plastic is a high strength polypropylene resin. This material provides good resistance to water, acids, alkalis, and organic liquids. The plastic material, therefore, serves as the material housing 3, encapsulation for the coil 7, and potting material for the electrical components on the printed cirucuit board 23.

The yoke 5 is preferably made of a strong stainless steel for rigidity and corrosion resistance. Apertures 33 are provided in the yoke 5 to receive molten plastic in the flowable state for enhancing the bond between the housing 3 and yoke 5 after the plastic sets.

Molded into the plastic housing 3 are an inlet port 25 and an outlet port 27 which are tapered and provided with threads for engaging the conduits, e.g., pipes (not shown), through which liquid flow is to be controlled by the valve 1. The respective diameters of the ports 25, 27 decrease in the direction of increasing penetration of the conduits resulting in a wedging action to provide a seal which tightens as the pipes are threaded into the ports 25, 27. The threads can be NPT, BSP or special based on selected requirements. Additionally, different types of tube fitting ends can be molded on during the encapsulation instead of the threaded ports.

Figure 3:
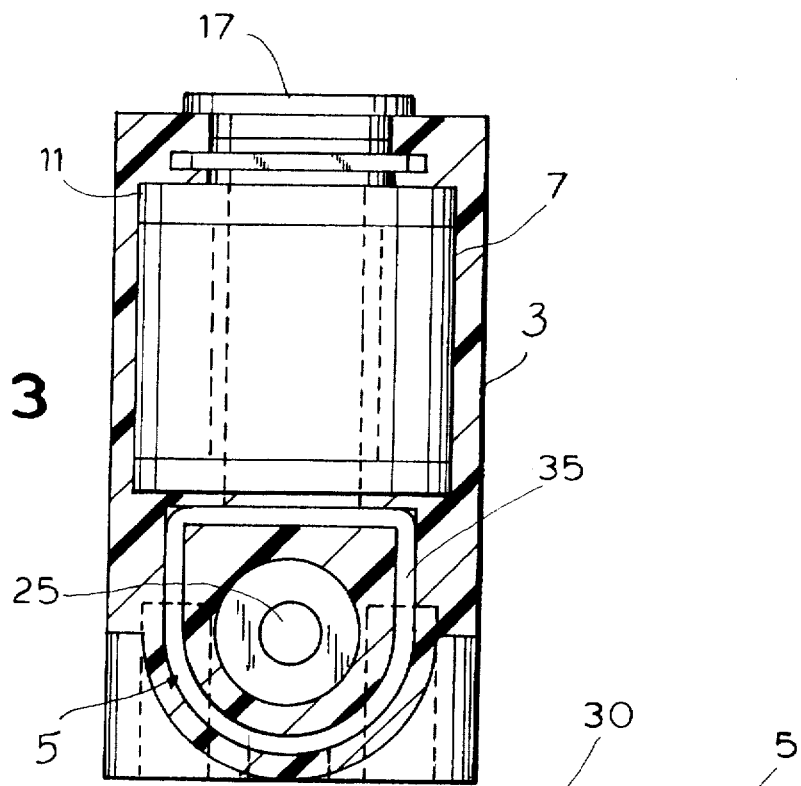
FIG. 3 is a sectional end view of a molded valve in accordance with the preferred embodiment of the invention taken through line 3—3 of FIG. 1.
Figure 4:
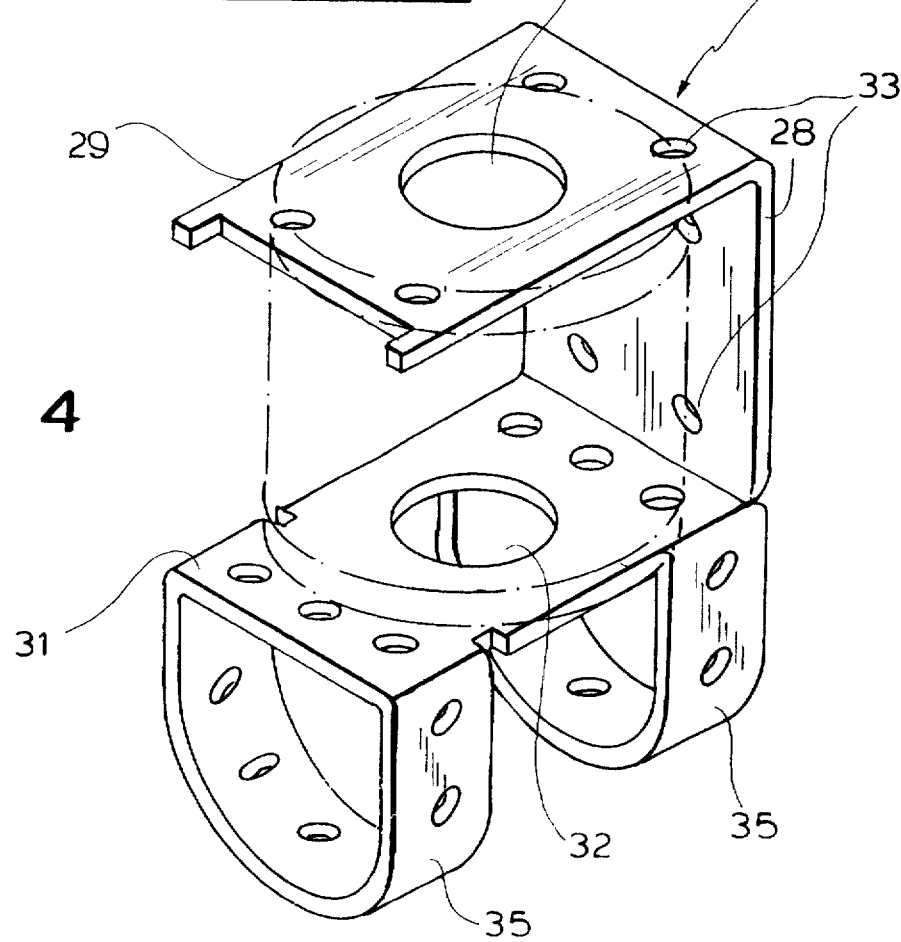
FIG. 4 is a perspective view of a component of the molded valve in accordance with the preferred embodiment of the invention shown in FIGS. 1–3.

Referring now to FIGS. 3 and 4, the yoke 5 has an upper C-shaped portion with an upper member 29 and a lower member 31. The horizontal members 29, 31 of the C-shaped yoke 5 and an intgral vertical connecting member 28 are planar. The horizontal members 29, 31 have axially aligned respective central apertures 30 and 32. The coil 7 is mounted within the yoke 5, between the members 29, 31, with the bore 12 of the armature guide 13 in axial alignment with the apertures 30, 32. The plug nut 17 is within the aperture 30 and the valve seat 22 is within the aperture 32.

Extending downwardly from the lower member 31 of the yoke 5 and formed integrally with it are two symmetric, axially displaced, D-shaped rings 35 which define a rigid frame for supporting conduits carrying a fluid, the flow of which is controlled by the valve 1. The rings 35 have a common planar portion coextensive with yoke member 31 and have axially spaced respective depending arcuate straps 34. The yoke 5, in addition to providing an efficient magnetic flux path for the solenoid valve 1, contributes to the integrity of the plastic valve body by providing an effective support against the stress of flexing between the conduits and housing 3 against impact to which the valve body may be subjected in its environment, and against burst pressure internal to the valve 1. No separate conduits of metal or other strong material are needed to form the inlet and outlet ports as the rings 35 provide sufficient reinforcement to the plastic housing to enable the ports to be molded into the plastic.

The valve 1 can be fabricated in a single mechanical injection process. The yoke 5 with coil 7, plug nut 17 and armature 15 can be encapsulated by the plastic material in virtually any type of injection process, e.g., transfer or plastic injection molding. Core pins of various sizes can be used during the molding process to determine the diameter and taper of the inlet and outlet ports.

In such a manufacturing process, the yoke 5 with the coil 7, the core tube 11, and the winding 9 circumscribing the core tube 11, the stationary pole piece 17 mounted at one end of the core tube 11, the movable armature 15 slidably mounted in the core tube 11, and printed circuit board 23 with a rectifier are placed in a mold, having the pattern of the solenoid housing, including an inlet port 25 and an outlet port 27. Removable core pins, each having a respective outer circumference corresponding to the inner circumference of the inlet and outlet ports, are placed in the mold for defining the size and shape of the ports. The mold is filled with a setting plastic material in the flowable state which occupies substantially all remaining unusable space in the mold. The plastic material is then made to set for encapsulating the coil 7 and forming the housing 3 with the inlet and outlet ports 25, 27. Thereafter, the solenoid 1 is removed from the mold and separated from the core pins.

The simultaneous plastic injection molding of the coil 7, printed circuit board 23, and yoke 5, including frame members 35, in the formation of the body of the valve 1 provides a high strength pressure vessel. The plastic valve of the preferred embodiment of the invention has a 0.20 CV flow rating, 150 psi pressure rating and has achieved a 750 hydrostatic burst pressure.

The manufacturing process of the instant invention allows marketing requirements to be incorporated at the time of manufacture. Lead time and component stocking are minimized by manufacturing coils based on rating requirements and simply selecting mold core pins used in the mold to form the valve orifice and set the valve stroke consistent with the immediate application.

It is to be appreciated that the foregoing is a description of a preferred embodiment of the invention to which variations and modifications may be made without departing from the spirit and scope of the invention. For example, the invention may be adapted to a normally open valve as well as a normally closed valve, or to a three-way valve, as well as a two-way valve, as will be known to those skilled in the art.

What is claimed is:

1. In a solenoid valve having a yoke with first and second spaced members, a coil mounted within said yoke between said first and second members, said coil having a core tube with two opposite ends and a winding circumscribing said core tube, a stationary pole piece mounted at one end of said core tube, an inlet port, an outlet port, a valve seat mounted between, and having an opening in communication with, said inlet port and said outlet port, a movable armature slidably mounted in said core tube, and a valve member mounted on said movable armature for selectively sealing and unsealing said valve seat opening, the improvement comprising frame means depending from, and integral with, said yoke, said frame means circumscribing said inlet port and said outlet port, and a housing comprising a setting plastic material encapsulating said yoke, said inlet port and said outlet port being molded into said housing whereby said frame means reinforces said housing adjacent said inlet port and said outlet port.

2. A solenoid valve according to claim 1 wherein said frame means comprises a first ring circumscribing said inlet port and a second ring circumscribing said outlet port.

3. A solenoid valve according to claim 2 wherein at least one of said first and second rings is D-shaped, having a planar portion coextensive with one of said yoke members and a depending arcuate strap.

4. A solenoid valve according to claim 2 wherein said first and second rings are D-shaped with a common planar portion coextensive with one of said yoke members and axially spaced respective depending arcuate straps.

5. A solenoid valve according to claim 1 wherein at least one of said ports tapers inwardly toward said valve seat opening resulting in a wedging action to provide a seal which tightens against a conduit inserted thereinto.

6. A solenoid valve according to claim 1 wherein said plastic material forms a coil encapsulation integral with said housing.

7. A method of making a solenoid valve comprising mounting in a yoke assembly having a yoke, a coil having a core tube with two opposite ends and a winding circumscribing said core tube, a stationary pole piece mounted at one end of said core tube, and a movable armature slidably mounted in said core tube, placing said yoke assembly in a mold, having the pattern of the solenoid housing, including an inlet port and an outlet port, mounting in said mold a removable core pin means having an outer circumference corresponding to the inner circumference of one of said inlet port and outlet port for defining the size and shape of said one port, filling the remaining space in said mold with a setting plastic material in a flowable state, causing said plastic material to set for encapsulating said coil and forming said housing with inlet and outlet ports, and separating said housing from said mold and core pin.

8. A method of making a solenoid valve according to claim 7 further comprising mounting in said mold a second removable core pin means having an outer circumference corresponding to the inner circumference of the other of said inlet port and outlet port for defining the size and shape of said other port.

* * * * *